United States Patent [19]
Okamoto et al.

[11] Patent Number: 5,788,920
[45] Date of Patent: Aug. 4, 1998

[54] OXYGEN BLOWING LANCE CAPABLE OF BEING USED IN AN ELECTRIC FURNACE

[75] Inventors: Hiroshi Okamoto; Nobuyoshi Takashiba, both of Okayama, Japan

[73] Assignee: Kawasaki Steel Corporation, Japan

[21] Appl. No.: 592,284

[22] Filed: Jan. 26, 1996

[30] Foreign Application Priority Data

| Jan. 31, 1995 | [JP] | Japan | 7-014167 |
| Jan. 31, 1995 | [JP] | Japan | 7-014168 |
| Jan. 31, 1995 | [JP] | Japan | 7-014169 |
| Jan. 31, 1995 | [JP] | Japan | 7-014170 |

[51] Int. Cl.$^6$ .................................................. C21C 5/32
[52] U.S. Cl. ................... 266/225; 75/10.61; 373/60
[58] Field of Search ............................ 266/225, 226; 75/10.61, 525, 10.4, 10.41; 373/60, 85

[56] References Cited

U.S. PATENT DOCUMENTS

| 238,628 | 3/1881 | Wurtenberger | 266/225 |
| 3,945,820 | 3/1976 | Brotzmann et al. | 266/225 |
| 4,653,730 | 3/1987 | Wunsche et al. | 266/225 |
| 4,986,847 | 1/1991 | Knapp et al. | 75/525 |

FOREIGN PATENT DOCUMENTS

| 560 846 | 10/1957 | Belgium . |
| 2 489 841 | 3/1982 | France . |
| 1 508 234 | 10/1969 | Germany . |
| 40 34 809 | 5/1992 | Germany . |

*Primary Examiner*—Scott Kastler
*Attorney, Agent, or Firm*—Austin R. Miller

[57] ABSTRACT

An oxygen blowing lance capable of directing oxygen jet streams onto a molten metal in an electric furnace, the lance being insertable into an electric furnace through a sidewall working port, the lance being positionable above the molten metal in the electric furnace. The lance includes a horizontal segment and an angled segment, the angled segment being positioned on the distal portion of the horizontal segment and being inclined relative to the horizontal segment. The lance also includes a tip, the tip being positioned on the distal portion of the angled segment, with the distal portion of the tip being directed toward the molten metal. The horizontal segment, the angled segment and the tip define an oxygen flow channel and a cooling water flow channel. The oxygen flow channel extends substantially the length of the lance, and the cooling water flow channel surrounds the oxygen flow channel. The lance also includes a plurality of nozzles, each having a throat portion having a throat diameter and an outlet portion having an outlet diameter, the throat portions of the nozzles being positioned on the distal portion of the tip. The nozzles are operatively engaged with the oxygen flow channel, and at least one of the nozzles is positioned nearer the molten metal than the other nozzles.

14 Claims, 7 Drawing Sheets

OXYGEN BLOWING LANCE CAPABLE OF BEING USED IN AN ELECTRIC FURNACE

BACKGROUND OF THE INVENTION

1. Field of the Invention

The present invention relates to a lance for blowing oxygen and, in particular, to a lance for blowing oxygen capable of being used in an electric furnace containing molten iron.

2. Description of the Related Art

Electric furnaces for the melting of metals, the refining of molten metals, and like processes, are well known in the art. Direct current electric furnaces melt metals and/or refine molten metals using an electric arc generated between an upper electrode disposed above the metal material and a lower electrode disposed on the bottom section, sidewall or a similar location on the furnace. In contrast, alternating current electric furnaces utilize an electric arc generated by conducting a current between three electrode disposed above the metal material. In both types of furnaces, however, the melting of a metal material, refining of a molten metal and like processes are accelerated by blowing oxygen or powder into the molten metal using a lance.

Figure 8:
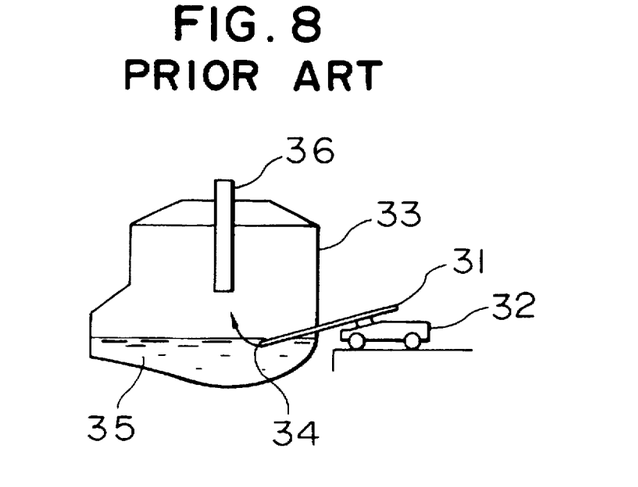
FIG. 8 is a schematic depiction of a conventional oxygen blowing lance.

An example of a conventional lance is disclosed in Japanese Utility Model Application Laid-Open No. 2-38457 and is shown in FIG. 8 herein. Lance 31, having a linear shape, is inserted into electric furnace, disposing an upper electrode 36, 33 through a sidewall by self-propelled cart 32. A single oxygen blowing nozzle 34 is formed at the extreme end of the lance 31.

A small diameter (about 40 mm) pipe usually comprises lance 31. Therefore, if the back pressure in the interior of the oxygen blowing nozzle 34 (i.e., gas pressure on the nozzle outlet side) is to be maintained at a critical pressure (nozzle inside pressure/atmospheric pressure >1.89), oxygen flow through the pipe must be increased to impractical levels. Thus, the back pressure in the interior of the nozzle is set at or below the critical pressure, that is, the velocity of oxygen ejected from nozzle 34 is at sonic velocity or less. Since the oxygen ejection velocity is equal to or less than sonic velocity, and the oxygen is fed through just one nozzle 34 as described above, oxygen is directly introduced into the molten metal to ensure a sufficient supply by dipping the extreme end of the lance 31 into molten metal 35.

However, when the extreme end of lance 31 is dipped into the molten metal 35 as described above, lance 31 is gradually consumed by the heat of molten metal 35. Consequently, replacement lances must be supplied to the self-propelled cart 32, which is troublesome and expensive. In addition, the extreme end of lance 31 can be bent by heat so that oxygen is ejected upward, which can damage a furnace wall to the extent that the furnace cannot be operated.

To address these problems, a water-cooled type lance has been disclosed in Japanese Patent Application Laid-Open No. 6-192718.

Figure 9:
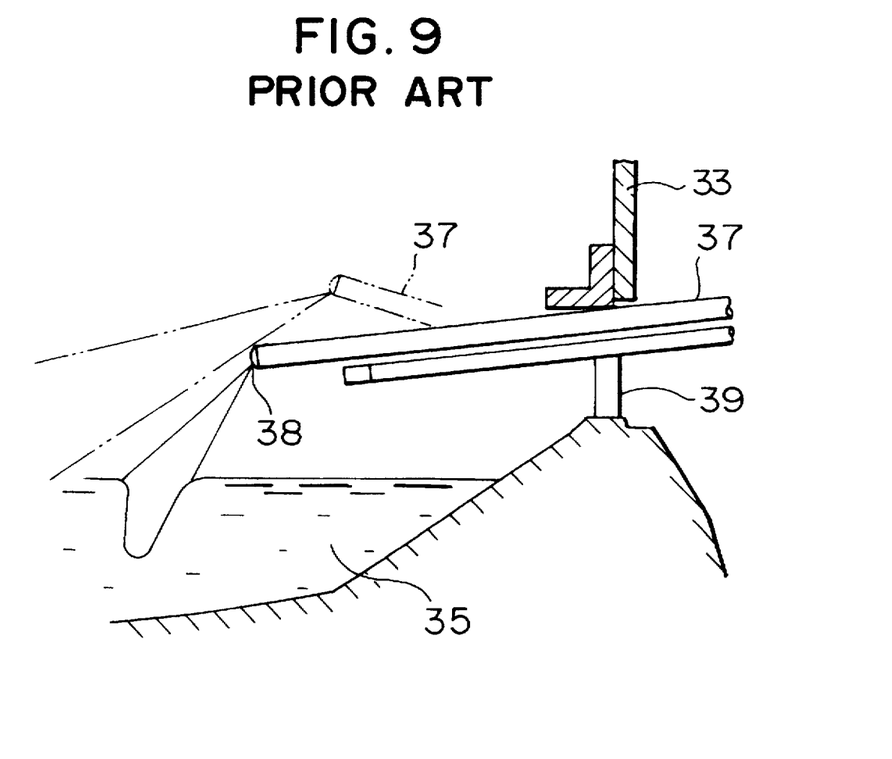
FIG. 9 is a schematic depiction of another conventional oxygen blowing lance.
Figure 10:
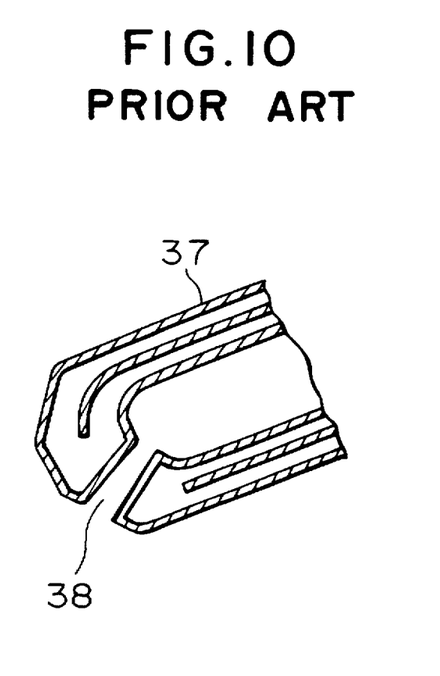
FIG. 10 is a cross-sectional view of the distal end of the conventional oxygen blowing lance shown in FIG. 9.

As shown in FIG. 9 herein, water-cooled and linearly-shaped lance 37 is inserted into electric furnace 33 and disposed above the surface of molten metal 35 through working port 39 in the sidewall of electric furnace 33. Further, a Laval type nozzle 38 having a slightly broadened end is used at the distal end of lance 37 to eject an oxygen jet stream to the surface of the molten metal 35. Since the Laval type nozzle 38 slightly broadens toward the end as seen in cross section and shown in FIG. 10, nozzle 38 can eject an oxygen jet stream at an ultrasonic velocity unlike ordinary straight nozzles and abruptly expanding nozzles (as seen in cross section).

As described above, water-cooled lance 37 increases the amount of oxygen supplied to the molten metal 35 by ejecting an oxygen jet stream at ultrasonic velocity using the Laval type nozzle 38. In other words, the above-described lance-degradation problems are solved by ejecting oxygen at ultrasonic velocity from a position above the molten metal 35, thereby increasing oxygen unitizing efficiency without having to introduce the extreme end of the lance 37 into the molten metal 35.

For molten metal refining in a converter, the water-cooled lance is inserted through an upper furnace port of the converter and ejects an oxygen jet stream to the molten metal through the Laval type nozzle at an ultrasonic velocity of 500 m/s or higher. The distance from the surface of the molten metal to the nozzle (hereinafter referred to as "lance height") is set between 2 to 4 m so that the velocity of the oxygen jet stream reaching the molten metal surface is 50 m/s or slower. Thus, scattered molten metal and slag generated when the oxygen jet stream collides against the surface of the molten metal is suppressed by limiting the stream velocity to 50 m/s or less.

However, when water-cooled lance 37 is inserted through working port 39 of the sidewall of said electric furnace 33, the lance height of lance 37 is limited by the size of the working port 39. Thus, the lance height range in electric furnace 33 is greatly limited as compared with the converter described above. Contemplated solutions to this problem include insertion of lance 37 through the upper portion of the electric furnace 33 as in the case of the converter, or increasing the lance height by tilting lance 37 upward as a whole as shown by a two-dot-and-dash-line in FIG. 9. However, since the height of the electric furnace 33 is about one half that of the converter, a lance height similar to that of the converter cannot be obtained. It is also difficult to insert lance 37 through the upper portion of the electric furnace 33 because the electrode 36 is disposed on the upper portion. Moreover, tilting lance 37 upward reduces the angle at which the oxygen jet stream strikes molten metal 35, thereby increasing the amount of slag and/or molten metal scattered to the sidewall of the furnace.

Since lance height is greatly limited when linear lance 37 is used with electric furnace 33, the velocity of the oxygen stream at the molten metal surface becomes 100 m/s or higher. Consequently, the impact energy of the oxygen jet stream on the surface of the molten metal 35 is increased greatly as compared with the case of the converter. As a result, the impact energy disadvantageously acts on the molten metal and slag as a stirring force and a shearing force, thereby causing a large amount of the molten metal and particulate slag to be scattered.

When scattered molten metal and slag are deposited on the wall or other components of the electric furnace, electrodes are often short-circuited through the furnace lid which can result in fire damage to the furnace lid. Water-cooled boxes, which typically cover the sidewall of the furnace, can also be damaged by scattering, whereby water leaks occur. Further, scatter-deposited metal falling from the furnace lid into the molten metal causes a temperature drop in the molten metal, decarbonization and other potential problems. Damage to electrodes caused by scattering can shorten electrode life.

Additionally, deposition of scattered molten metal on the furnace lid increases the weight of the furnace lid, thereby inhibiting movement of the furnace lid upward and downward. The deposition of scattered molten metal on the water-cooled lance melts and damages the lance. Also, the yield of iron is lowered when a large quantity of molten metal is scattered.

It is clear that there is a strong need in the art for an oxygen blowing lance which can avoid these problems.

OBJECT OF THE INVENTION

An object of the invention is to provide a durable oxygen blowing lance which limits the scattering of molten metal and slag when oxygen is blown through the lance into molten metal in a furnace.

Other objects of the invention will become apparent from the description provided below.

SUMMARY OF THE INVENTION

To achieve the objects of the invention, there is provided an oxygen blowing lance for an electric furnace which may be inserted into the electric furnace from a working port on the sidewall of the electric furnace and is disposed above molten metal in the electric furnace. The lance has nozzles positioned on the distal portion thereof for ejecting oxygen to the surface of the molten metal. The lance includes an oxygen flow channel extending substantially the length of the lance, and a cooling water channel surrounding the oxygen flow channel. The lance has a horizontal segment adjacent to an angled segment, the angled segment being inclined and positioned distally relative to the horizontal segment. A lance tip is positioned on the distal portion of the angled segment, with at least the distal portion of the tip itself facing the surface of the molten metal. The tip is also provided with a plurality of nozzles on its distal portion.

Since the angled segment of the lance is inclined, the distal end of the lance is higher than the working port through which it is inserted. As a result, lance height is increased without decreasing the angle at which the oxygen jet stream strikes the molten metal, as is required in the case of a conventional lance.

An embodiment of the invention utilizes straight nozzles, i.e., nozzles having a substantially uniform diameter. Straight nozzles limit the maximum ejection velocity to sonic velocity. Thus, even if the back pressure in the interior of the nozzle is higher than the critical pressure, the oxygen jet stream velocity at the molten metal surface is slowed, thereby reducing the impact energy imparted to the molten metal by the oxygen stream. The same is true of an abruptly expanding nozzle, i.e., a nozzle having an increasing diameter from throat to outlet, which can likewise be used in the invention. Ejection velocity can be set to any selected velocity equal to or less than sonic velocity by adjusting the ratio of the small diameter portion (throat diameter) thereof to the large diameter portion (outlet diameter) thereof, and the back pressure in the interior of the nozzle.

The invention also promotes effective oxygen/molten metal reaction by compensating for the potential shortage of oxygen supplied to the molten metal caused by setting the oxygen ejection velocity to sonic velocity or less. This is accomplished by utilizing a plurality of nozzles.

The invention also enables a plurality of nozzles to direct a broad oxygen jet stream onto a large area of the molten metal surface, thereby lowering the impact energy per unit area, which in turn reduces molten metal scattering. This is accomplished by adjusting nozzle dimensions and/or lance height. Specifically, in an embodiment of the invention where a plurality of nozzles are positioned on the distal portion of the lance and some of the nozzles are close enough to the surface of the molten metal to potentially cause scattering, the oxygen jet stream ejection velocities from the respective nozzles are controlled by increasing the outlet diameters of nozzles nearer to the surface of the molten metal relative to the outlet diameters of more distant nozzles, so that the ejection velocity of the nearer nozzles is slowed relative to the more distant nozzles.

In an embodiment of the invention where a plurality of the nozzles of the straight and abruptly expanding type are positioned on the distal portion of the lance, and where some of the nozzles are close enough to the surface of the molten metal to potentially cause scattering, the diameters of the abruptly expanding nozzles, which can be varied to produce any oxygen ejection velocity up to sonic velocity, are adjusted so that the oxygen ejection velocity of the abruptly expanding nozzles is slowed relative to the oxygen ejection velocity of the straight nozzles. This is typically accomplished by increasing the outlet diameter relative to the throat diameter.

Other embodiments of the present invention will become apparent to those of ordinary skill in the art from the following detailed description.

DESCRIPTION OF THE INVENTION

The invention will now be described in reference to FIGS. 1–7. The description and figures are illustrative of the invention and are not intended to limit the scope of the invention defined in the appended claims.

Figure 1:
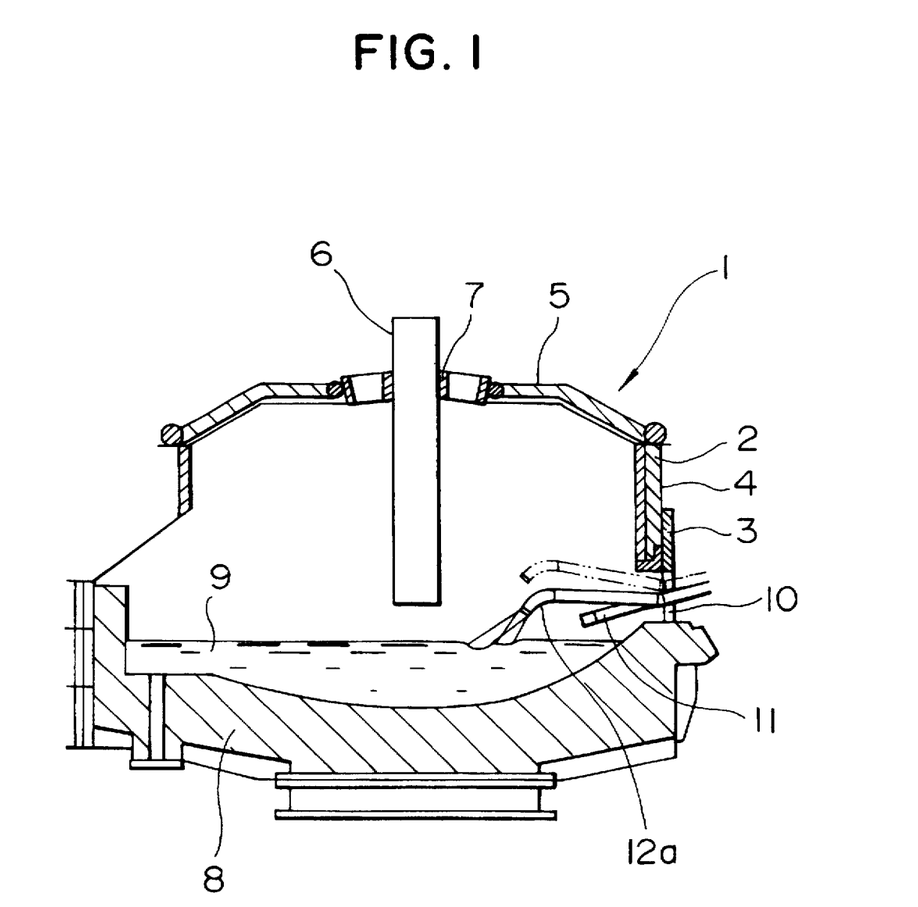
FIG. 1 is a schematic side cross-sectional view showing an oxygen blowing lance in accordance with the invention disposed in an electric furnace.

Referring to FIG. 1, direct current furnace 1 (hereinafter simply referred to as electric furnace 1) includes a furnace body 2 composed of a refractory material, a water-cooled box 3 covering a sidewall 4 of furnace body 2, furnace lid 5 positioned on the upper portion of furnace body 2, and an upper electrode 6 which is vertically and movably inserted into electric furnace 1 through a small ceiling portion 7 at the center of furnace lid 5. Electric arc is generated at upper electrode 6 by conducting a direct current between upper electrode 6 and a lower electrode (not shown) mounted on or near bottom section 8 of furnace body 2. Heat generated by the electric arc is used to melt scraps charged into electric furnace 1, refine a molten metal 9, increase the temperature of a molten iron, or the like.

Then, a powder blowing lance 11 and two water-cooled oxygen blowing lances 12a and 12b (shown in FIG. 3) are inserted into electric furnace 1 through a working port 10 located on sidewall 4 of furnace body 2 to facilitate the heating of the molten metal 9. Lances 11, 12a and 12b can be positionally adjusted relative to each other as well as advanced into and retracted from electric furnace 1 by a drive unit (not shown).

Water-cooled oxygen blowing lances 12a will now be described in reference to FIGS. 2–5. As lances 12a and 12b are identical and are disposed symmetrically to each other in a horizontal direction as shown in FIG. 3, it is understood that the following description of lance 12a also applies to lance 12b.

Figure 2:
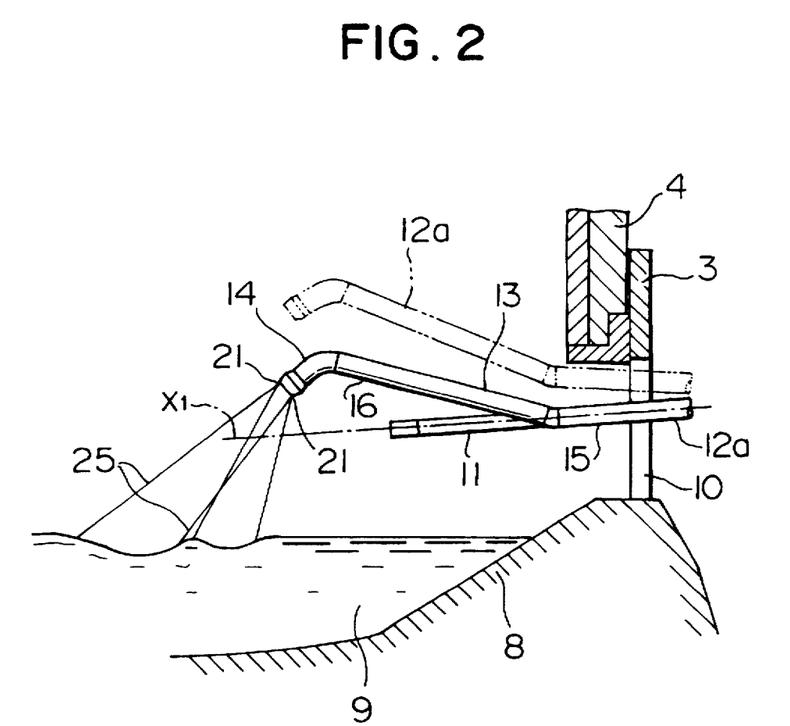
FIG. 2 is an enlarged view of a portion of FIG. 1 showing the oxygen blowing lance in more detail.
Figure 3:
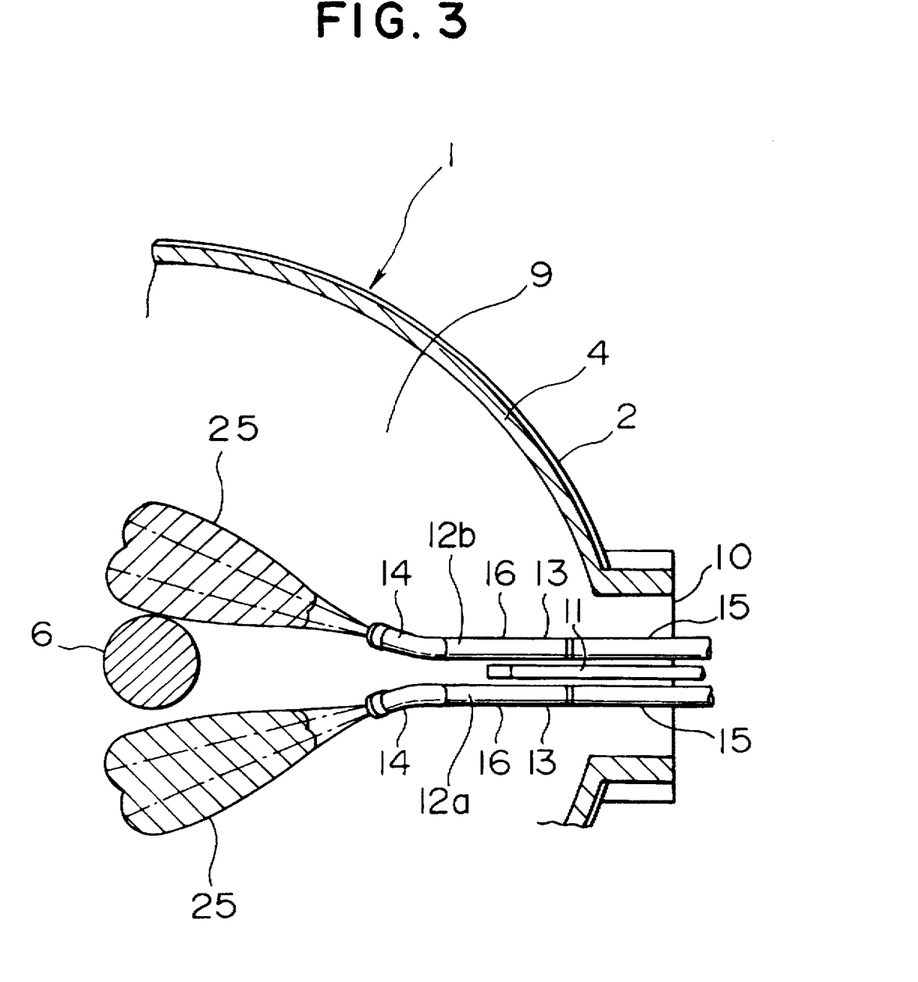
FIG. 3 is a plan view of FIG. 2.

As shown in FIGS. 2 and 3, oxygen blowing lance 12a includes a body 13 inserted into electric furnace 1 through working port 10. Body 13 includes a horizontal segment 15 and angled segment 16 inserted into electric furnace 1 substantially in a horizontal direction through working port 10. Angled segment 16 is adjacent to and inclines from the distal portion of horizontal segment 15.

Figure 4:
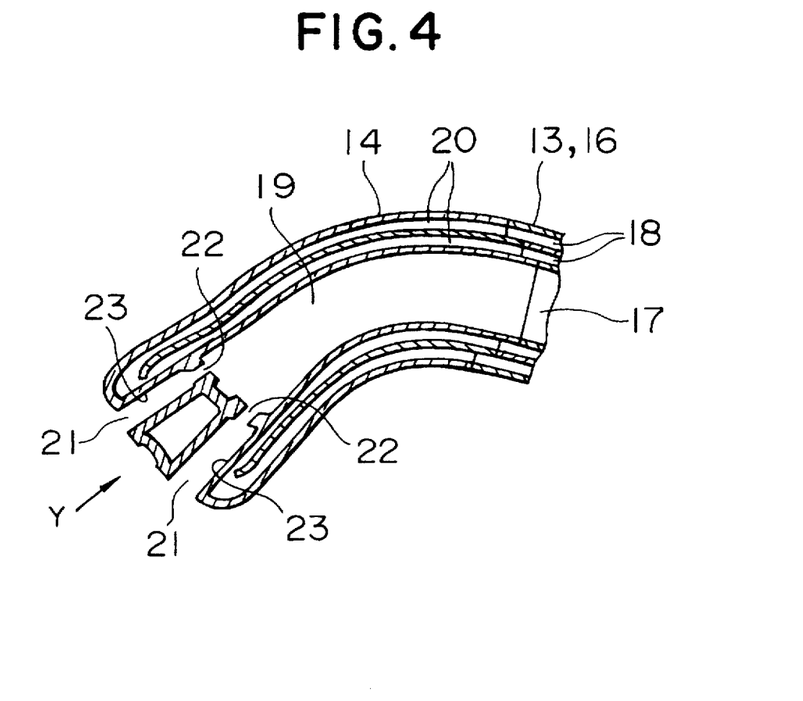
FIG. 4 is a cross-sectional view of an oxygen blowing lance in accordance with the invention.

As shown in FIG. 4, an oxygen flow channel 17 is positioned in body 13 and is surrounded by a cooling water channel 18. Lance tip 14 is connected to the distal portion of angled segment 16.

As shown in FIGS. 2 and 4, lance tip 14 is bent downward from the distal portion of angled segment 16, and extends therefrom so that the distal end surface of lance tip 14 faces to the surface of the molten metal 9 between the sidewall 4 and the upper electrode 6 (refer to FIG. 3). Lance tip 14 includes an oxygen flow channel 19 and a cooling water channel 20 in operative engagement with oxygen flow channel 17 and cooling water channel 18, respectively, of body 13. As shown in FIG. 2, the distal end of the lance tip 14 is positioned above the axial line $X_1$ of the horizontal segment 15 (a line extending in the lance insertion direction), and can be moved vertically over a wide range without rendering the collision angle of the oxygen jet stream 25 against molten metal 9 disadvantageously small.

Figure 5:
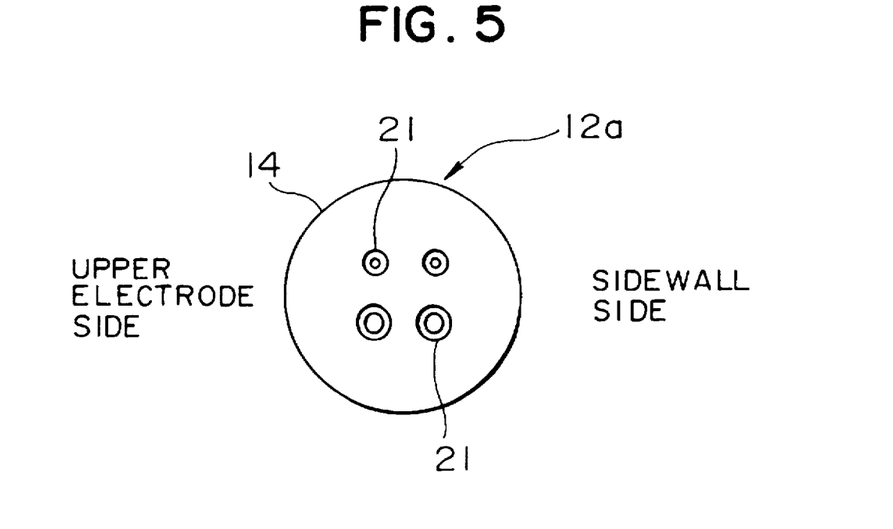
FIG. 5 is a view of the oxygen blowing lance of FIG. 4, without cross section, observed from the direction of arrow Y in FIG. 4.

As shown in FIG. 5, lance tip 14 has four nozzles 21 formed on the distal end surface thereof. As shown in FIG. 4, the nozzles 21 are of the abruptly expanding type. Each nozzle 21 has a small throat diameter portion 22 and a large outlet diameter portion 23. The oxygen jet stream 25 ejection velocity can be set to any value up to and including sonic velocity by adjusting the ratio of throat diameter portion 22 to the outlet diameter portion 23, and the back pressure in the nozzle.

As shown in FIG. 5, a pair of the four nozzles 21 is positioned on the lower portion of the distal end surface of lance tip 4, that is, nearer to the surface of the molten metal 9, while the other pair of nozzles is positioned on the upper portion on the distal end surface of lance tip 4, that is, farther from the surface of the molten metal 9 relative to the first pair. The individual nozzles of each nozzle pair described above are spaced laterally from each other, also shown in FIG. 5. Further, the pair of nozzles 21 positioned nearer to the surface of the molten metal 9 have an outlet diameter larger than the pair of nozzles 21 positioned farther from the molten metal surface. With this arrangement, the ejection velocity of oxygen jet streams 25 from the nearer pair of nozzles 21 is slowed relative to the ejection velocity of oxygen jet streams 25 from the farther pair of nozzles 21 to substantially balance the velocities of the oxygen jet streams 25 at the molten metal 9.

As shown in FIG. 3, lances 12a and 12b are positioned to direct oxygen jet streams 25 toward the surface of molten metal 9 between sidewall 4 and upper electrode 6. Thus, the oxygen jet streams 25 ejected from nozzle 21 do not directly strike upper electrode 6.

Figure 6:
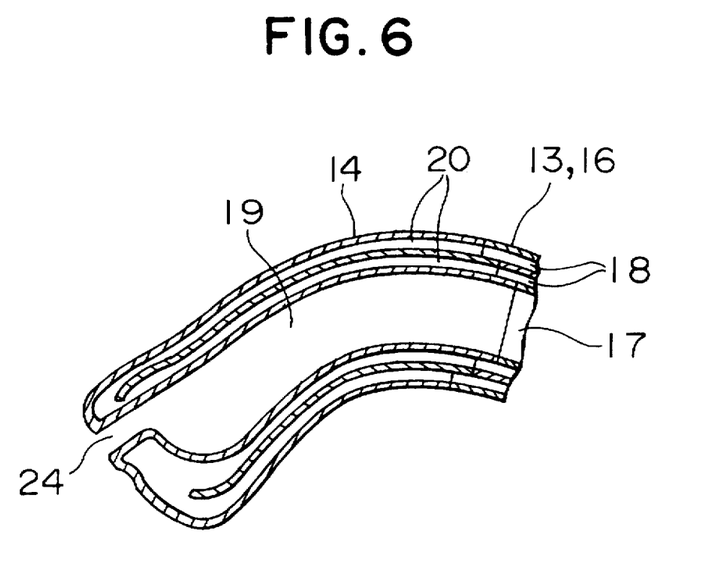
FIG. 6 is a cross-sectional view of another embodiment of an oxygen blowing lance in accordance with the invention.

Straight nozzles of various diameters may be used at the distal end of lance tip 14 in place of the aforesaid abruptly expanding nozzle 21. An example of a straight nozzle 24 is shown in FIG. 6. Since straight nozzles 24 have a uniform cross-sectional shape, i.e., the throat diameter is substantially the same as the outlet diameter, the ejection velocity can be no greater than sonic velocity even if the back pressure in the nozzle is greater than a critical pressure.

Further, the nozzles 24 positioned nearer to the surface of the molten metal 9 have an outlet diameter larger than the nozzles 24 positioned farther from the molten metal surface.

Figure 7:
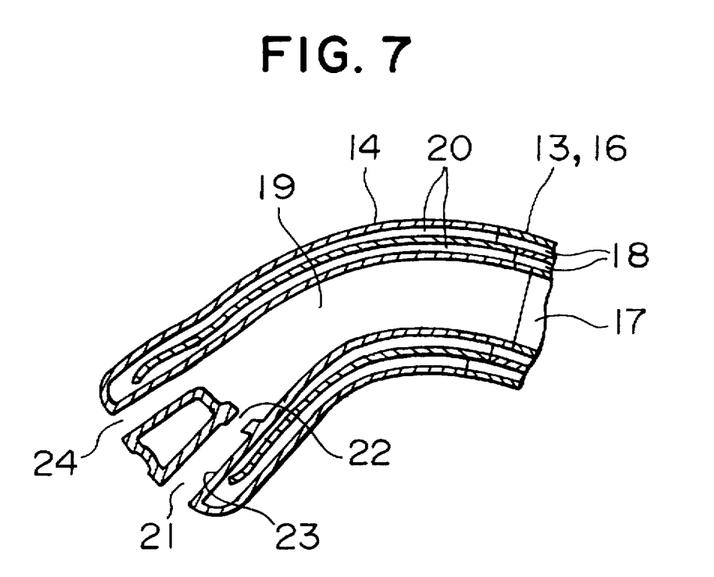
FIG. 7 is a cross-sectional view of the another embodiment of an oxygen blowing lance in accordance with the invention.

As shown in FIG. 7, both abruptly expanding nozzles 21 and straight nozzles 24 may be used at the distal portion of a lance tip. Abruptly expanding nozzle 21 is disposed on the lower side of the distal end surface of the lance tip, that is, nearer to the surface of the molten metal. Nozzle 24 is farther from the surface of the molten metal than abruptly expanding nozzle 21.

A test was carried out using the oxygen blowing lance in accordance with the invention much as described above in reference to FIGS. 1–5. When the oxygen blowing lances were at a lance height of 300–1250 mm and contained an amount of oxygen equal to 60 $m^3$-norm/min per a lance, the velocity of the oxygen jet stream at the molten metal surface was controlled to 50 m/s or lower by adjusting the ejection velocity from a plurality of abruptly expanding nozzles to 150 m/s.

A method of blowing oxygen through oxygen blowing lances in accordance with the invention will now be described in conjunction with an operational procedure involving an electric furnace.

Scraps of a steel making material are charged into direct current electric furnace, and then are partially melted by electric arc generated from an upper electrode. Molten iron is charged into the direct current electric furnace, oxygen blowing lances are introduced into the electric furnace through a sidewall working port, then an oxygen jet stream is directed through abruptly expanding nozzles of the oxygen blowing lances onto the molten iron/scraps mixture in the vicinity of the working port so that scrap melting is accelerated. This procedure is known as a cutting operation.

When the scraps in the vicinity of the working port are melted, the oxygen blowing lances are advanced into the inner portion of the electric furnace to thereby successively melt the scraps from the vicinity of the working port to the inner portion of the electric furnace.

When the melting of the scraps is complete or substantially complete, the oxygen blowing lances are lifted (as shown by a two-dot-and-dash line in FIG. 2) to increase the lance height, and a temperature elevation and/or refining of the molten metal is carried out by directing an oxygen jet stream to the surface of the molten metal from the abruptly expanding nozzles of the oxygen blowing lances.

The velocity of the oxygen jet stream at the molten metal surface is controlled to about 50 m/s or less, which is no more than one-half of the conventional velocity, by directing the oxygen jet stream to the molten metal surface from an elevated position without reducing the striking angle of the oxygen jet stream against the molten metal. Velocity of the oxygen jet stream at the molten metal surface is also controlled by limiting the ejection velocities of the oxygen jet streams from the abruptly expanding nozzles to sonic velocity or less as described above. As a result, impact energy applied to the surface of the molten metal can be greatly reduced.

Even with ejection velocities limited to sonic velocity, sufficient oxygen for reaction is supplied because of the plurality of abruptly expanding nozzles feeding oxygen from the lance tip. Further, the oxygen jet stream can cover a large percentage of the surface area of the molten metal due to the increased lance height and plurality of nozzles, thereby increasing the surface area of molten metal impacted by the oxygen jet stream. Consequently, the impact energy per unit area of molten metal can be reduced and, as a result, the problematic scattering of molten metal and slag is greatly reduced as compared with processes involving conventional lances.

The degradation of the upper electrode is also reduced by the oxygen blowing lances of the invention because the oxygen jet stream ejected from the nozzles is directed to the surface of the molten metal between the sidewall and the upper electrode. Thus, the potentially damaging oxygen jet stream does not directly strike the upper electrode. Further, since the oxygen blowing lances are disposed above the surface of the molten metal, the lances are not consumed by the heat of the molten metal as in the case of conventional lances.

Although this invention has been described with reference to specific forms of apparatus and method steps, it is understood that many equivalent forms and steps may be substituted without departing from the spirit and scope of the invention defined in the appended claims.

What is claimed is:

1. An oxygen blowing lance for directing oxygen jet streams onto a molten metal in an electric furnace, said electric furnace having a sidewall and a working port positioned on said sidewall, said lance extending into said electric furnace through said working port in an operable position above said molten metal in said electric furnace, said lance comprising:

a substantially horizontal segment having a distal portion;

an angled segment having a proximal portion and a distal portion, said proximal portion of said angled segment being positioned on said distal portion of said substantially horizontal segment, said angled segment inclining upwardly relative to said substantially horizontal segment wherein said distal portion of said angled segment is positionable at a higher vertical position than said working port;

a tip having a proximal portion and a distal portion, said proximal portion of said tip being positioned on said distal portion of said angled segment, said distal portion of said tip being directed toward said molten metal;

said substantially horizontal segment, said angled segment and said tip defining an oxygen flow channel and a cooling water flow channel, said oxygen flow channel extending substantially the length of said lance and having a longitudinal axis, said cooling water flow channel surrounding said oxygen flow channel about said longitudinal axis;

a plurality of nozzles each having a throat portion having a throat diameter and an outlet portion having an outlet diameter, said throat portion of each of said nozzles being positioned adjacent to said distal portion of said tip, said nozzles being operatively engaged with said oxygen flow channel, and at least one of said nozzles being positioned at a lower vertical height than other said nozzles.

2. The oxygen blowing lance according to claim 1, wherein said throat diameter of said nozzles is smaller than said outlet diameter of said nozzles such that said nozzles have an abruptly expanding cross section.

3. The oxygen blowing according to claim 1, wherein said throat diameter of said nozzles is substantially equal to said outlet diameter of said nozzles.

4. The oxygen blowing lance according to claim 1, wherein at least one of said nozzles has said throat diameter smaller than said outlet diameter to form an abruptly expanding nozzle, and at least one of said nozzles has said throat diameter and said outlet diameter substantially equal to form a straight nozzle, said abruptly expanding nozzle being positioned at a lower vertical height than said straight nozzle.

5. The oxygen blowing lance according to claim 1, wherein said at least one of said nozzles being positioned at a lower vertical height than other said nozzles has an outlet diameter larger than other said nozzles.

6. The oxygen blowing lance according to claim 2, wherein said at least one of said nozzles being positioned at a lower vertical height than other said nozzles has an outlet diameter larger than other said nozzles.

7. The oxygen blowing lance according to claim 3, wherein said at least one of said nozzles being positioned at a lower vertical height than other said nozzles has an outlet diameter larger than other said nozzles.

8. An oxygen blowing lance according to claim 2, wherein said electric furnace further includes an upper electrode, and wherein said nozzles formed in said tip of said lance are oriented in said electric furnace to direct said oxygen jet streams onto said molten metal at a location between said upper electrode and said sidewall.

9. An oxygen blowing lance according to claim 3, wherein said electric furnace further includes an upper electrode, and wherein said nozzles formed in said tip of said lance are oriented in said electric furnace to direct said oxygen jet streams onto said molten metal at a location between said upper electrode and said sidewall.

10. An oxygen blowing lance according to claim 4, wherein said electric furnace further includes an upper electrode, and wherein said nozzles formed in said tip of said lance are oriented in said electric furnace to direct said oxygen jet streams onto said molten metal at a location between said upper electrode and said sidewall.

11. An oxygen blowing lance according to claim 5, wherein said electric furnace further includes an upper electrode, and wherein said nozzles formed in said tip of said lance are oriented in said electric furnace to direct said oxygen jet streams onto said molten metal at a location between said upper electrode and said sidewall.

12. An oxygen blowing lance according to claim 6, wherein said electric furnace further includes an upper electrode, and wherein said nozzles formed in said tip of said lance are oriented in said electric furnace to direct said oxygen jet streams onto said molten metal at a location between said upper electrode and said sidewall.

13. An oxygen blowing lance according to claim 7, wherein said electric furnace further includes an upper electrode, and wherein said nozzles formed in said tip of said lance are oriented in said electric furnace to direct said oxygen jet streams onto said molten metal at a location between said upper electrode and said sidewall.

14. A lance for directing at least one oxygen jet stream onto a molten metal in a furnace, said furnace comprising a sidewall and a working port defined by said sidewall, wherein a portion of said lance is positionable through said working port and within an interior of said furnace, said lance comprising:

a substantially horizontal segment having a longitudinal axis and a distal portion;

an angled segment extending from said distal portion of said substantially horizontal segment, said angled segment having an angled axis and a distal portion, wherein said angled axis of said angled segment is oriented at an upward incline relative to said longitudinal axis of said substantially horizontal segment; and a tip segment extending from said distal portion of said angled segment, said tip segment defining at least one nozzle oriented to direct said oxygen jet stream onto said molten metal in said furnace, wherein said tip segment is adapted to be positioned at a location above said longitudinal axis of said substantially horizontal segment.

* * * * *